United States Patent
Ochiai

(10) Patent No.: US 10,130,083 B2
(45) Date of Patent: Nov. 20, 2018

(54) LINE ROLLER AND SPINNING REEL FOR FISHING HAVING SAME

(71) Applicant: Shimano Inc., Sakai, Osaka (JP)

(72) Inventor: Koji Ochiai, Osaka (JP)

(73) Assignee: Shimano Inc., Osaka (JP)

( * ) Notice: Subject to any disclaimer, the term of this patent is extended or adjusted under 35 U.S.C. 154(b) by 170 days.

(21) Appl. No.: 15/288,922

(22) Filed: Oct. 7, 2016

(65) Prior Publication Data

US 2017/0164593 A1 Jun. 15, 2017

(30) Foreign Application Priority Data

Dec. 11, 2015 (JP) ................................ 2015-242602
Dec. 11, 2015 (JP) ................................ 2015-242607

(51) Int. Cl.
*A01K 89/01* (2006.01)

(52) U.S. Cl.
CPC .... *A01K 89/01085* (2015.05); *A01K 89/0114* (2013.01); *A01K 89/011221* (2015.05); *A01K 89/011222* (2015.05); *A01K 89/011223* (2015.05)

(58) Field of Classification Search
CPC .............. A01K 89/01; A01K 89/01081; A01K 89/01082; A01K 89/011221; A01K 89/011222; A01K 89/011223
See application file for complete search history.

(56) References Cited

U.S. PATENT DOCUMENTS

| | | | | |
|---|---|---|---|---|
| 3,602,559 | A * | 8/1971 | Hirschler | ............ F16C 33/6618 277/420 |
| 4,402,515 | A * | 9/1983 | Malott | ................... F16J 15/445 277/415 |
| 6,161,786 | A * | 12/2000 | Ohara | ................. A01K 89/0108 242/157 R |
| 9,961,888 | B2 * | 5/2018 | Ochiai | ........... A01K 89/011222 |
| 2013/0206889 | A1 * | 8/2013 | Ochiai | ................. F16J 15/3204 242/322 |
| 2013/0322803 | A1 * | 12/2013 | Gruber | .................. F16C 23/086 384/477 |
| 2014/0159318 | A1 * | 6/2014 | Lattime | ................ F16J 15/3256 277/412 |

(Continued)

FOREIGN PATENT DOCUMENTS

JP 6-15469 U 3/1994
JP 2004-290153 A 10/2004

(Continued)

OTHER PUBLICATIONS

European Search Report of corresponding EP patent Application No. 16 20 3150.4 dated May 15, 2017.

*Primary Examiner* — Emmanuel M Marcelo
(74) *Attorney, Agent, or Firm* — Global IP Counselors, LLP

(57) ABSTRACT

A line roller for guiding the fishing line onto a spool of a spinning reel for fishing includes a cylindrical guide member including a guide surface for guiding the fishing line on the outer perimeter, an axle bearing member that rotatably supports an inner perimeter surface of the guide member, a support member that supports the axle bearing member, and a grease holding unit that forms a space leading from the axle bearing member to the guide member and that holds a water-repellent grease in the space.

23 Claims, 8 Drawing Sheets

(56) References Cited

U.S. PATENT DOCUMENTS

2014/0312153 A1* 10/2014 Hiraoka ........... A01K 89/01085
242/234

FOREIGN PATENT DOCUMENTS

| | | |
|---|---|---|
| JP | 2006-101704 A | 4/2006 |
| JP | 2007-209357 A | 8/2007 |
| JP | 2011-188764 A | 9/2011 |

* cited by examiner

LINE ROLLER AND SPINNING REEL FOR FISHING HAVING SAME

CROSS-REFERENCE TO RELATED APPLICATIONS

This application claims priority based on Japanese Patent Application Nos. 2015-2015-242602, filed in the Japan Patent Office on Dec. 11, 2015, and 2015-242607, filed in the Japan Patent Office on Dec. 11, 2015, the contents of each of which are hereby incorporated herein by reference.

BACKGROUND

Field of the Invention

The present invention relates to a line roller and a spinning reel for fishing that comprises the line roller.

Background Information

Spinning reels for fishing can include a spool, a rotor that comprises a pair of rotor arms, and a fishing line guiding mechanism (so-called "bail arm") that is pivotably mounted to the distal end of the pair of rotor arms (for example, see Japanese Published Unexamined Application No. 2006-101704). The fishing line guiding mechanism is a mechanism for guiding the fishing line to the spool. This fishing line guiding mechanism comprises a ball, a pair of bail support members that support the two ends of the bail, and a line roller.

A line roller, in general, comprises a guide member and an axle bearing member such as a bearing. The guide member is rotatably mounted on the axle bearing member. Since the line roller is used in an environment that easily comes in contact with seawater and the like, seawater etc. tends to enter the axle bearing member. When seawater. etc. enters the axle bearing member, solidification of salt and rust occur, which reduces the functionality of the axle bearing member. Therefore, there are inventions in which water-repellent grease is included inside the axle bearing member to prevent seawater, etc. from entering the axle bearing member (for example see Japanese Published Unexamined Application No. 2004-290153).

Further, some conventional devices employ a magnetic sealing mechanism that uses a magnetic fluid to seal the axle bearing member (for example, see Japanese Published Unexamined Application No. 2011-188764).

SUMMARY

Even if seawater is prevented from entering the axle bearing, if seawater comes in contact with the outer surface of the axle bearing member, the salt content solidifies and enters the axle bearing, generating noise and preventing smooth rotation. Further, if the axle bearing member is made of metal, rust appears on the outer surface due to water, and the rust enters the axle bearing member, reducing the functionality of the axle bearing member. Accordingly, it is preferable that seawater, etc does not penetrate to the periphery of the axle bearing member as much as possible.

In addition, a magnetic sealing mechanism that uses magnetic fluid can be employed. These magnetic sealing mechanisms generally have a complex structure, such as the requirement of a magnet, a magnetic part, and a magnetic fluid. Moreover, the cost can be expensive, and also has the problem that maintenance can be difficult.

The present invention was devised to solve the problems described above, and an object thereof is to provide a line roller with a structure in which seawater, etc. cannot easily penetrate to the periphery of the axle bearing member, and a spinning reel for fishing comprising a line roller in which the axle bearing member is sealed with a simple structure.

(1) The line roller according to the present invention is, a line roller for guiding a fishing line to a spool of a spinning reel for fishing, comprising a cylindrical guide member comprising a guide surface for guiding the fishing line on the outer perimeter, an axle bearing member that rotatably supports an inner perimeter surface of the guide member, a support member that supports the axle bearing member, and a grease holding unit that forms a space leading from the axle bearing member to the guide member and that holds a water-repellent grease in the space.

According to this configuration, since water-repellent grease is held in a space leading from the axle bearing member to the guide member, it is possible to repel and block seawater, etc., which tries to penetrate to the axle bearing member through the space, and to make it difficult for the seawater, etc to penetrate to the periphery of the axle bearing member.

(2) Preferably, the grease holding unit can include a seal member made of an elastic member that is disposed between the guide member and the support member.

(3) Preferably, the seal member comprises a fixed portion that is fixed to one of the guide member and the support member, and a lip portion that extends from the fixed portion toward the other member, and in which the thickness of the distal end portion is thinner than the thickness of the fixed portion.

(4) Preferably, the grease holding unit comprises a first annular protruding member having an annular protrusion that is projected in the axial direction or the radial direction of the rotation of die axle bearing member, and a second annular protruding member having an annular protrusion that projects adjacently in a direction that opposes the annular protrusion.

(5) Preferably, the grease holding unit comprises an annular protruding member having an annular protrusion that projects in the axial direction or the radial direction of the rotation of die axle bearing member, and an annular recessed member having an annular recess that is recessed complementarily to the annular protrusion.

(6) Preferably, the axle bearing member is a sliding slider bearing that rotatably supports the guide member.

(7) Preferably, the axle bearing member is a ball bearing comprising an outer ring that contacts the guide member, an inner ring that contacts the support member, and a plurality of rolling bodies disposed between the outer ring and the inner ring.

(8) Preferably, a holding member connecting the guide member and the outer ring is disposed between the guide member and the outer ring, and the holding member forms a part of the grease holding unit.

(9) Preferably, the water-repellent grease is also filled inside the axle bearing member.

(10) Preferably, the water-repellent grease is held in at least a portion of the space that leads to the guide member and at least one outer end surface of the axle bearing member in the rotary support shaft direction.

(11) Preferably, a lubricating grease that is different from the water-repellent grease is held on the other outer end surface of the axle bearing member in the rotary support shaft direction.

(12) The spinning reel for fishing according to another embodiment of the present invention comprises a rotor that is rotated by a rotational operation of a handle rotatably supported by a reel body, and a fishing line guiding device that comprises a line roller for guiding a fishing line to a spool to which the fishing line is wound and that is rotated with the rotor, the line roller comprising a cylindrical guide member comprising a guide surface for guiding the fishing line on the outer perimeter, an axle bearing member that rotatably supports an inner perimeter surface of the guide member, a support member that supports the axle bearing member, and an axle bearing seal mechanism disposed in the periphery of the axle bearing member and that prevents the flow of water to the axle bearing member, and the axle bearing seal mechanism comprising a grease holding unit that forms a space leading from the axle bearing member to the guide member and that holds a water-repellent grease in the space.

According to this configuration, it is possible to seal the axle bearing portion of the line roller with a simple configuration, wherein a space is formed that leads from the axle bearing member of the line roller to the guide member, in which is held a water-repellent grease.

(13) Preferably, the axle bearing seal mechanism further comprises a grease receiving part for receiving the water-repellent grease that flows out, when the water-repellent grease flows out.

(14) Preferably, the grease holding unit comprises a seal member made of an elastic member that is disposed between the guide member and the support member.

(15) Preferably, the seal member comprises a fixed portion that is fixed to one of the guide member and the support member, and a lip portion that extends from the fixed portion toward the other member, and in which the thickness of the distal end portion is thinner than the thickness of the fixed portion.

(16) Preferably, the grease holding unit comprises a first annular protruding member having an annular protrusion that is projected in the axial direction or the radial direction of the rotation of the axle bearing member, and a second annular protruding member having an annular protrusion that is projected adjacently in a direction that opposes the annular protrusion.

(17) Preferably, the grease holding unit comprises an annular protruding member having an annular protrusion that is projected in the axial direction or the radial direction of the rotation of the axle bearing member, and an annular recessed member having an annular recess that is recessed complementarily to the annular protrusion.

(18) Preferably, the axle bearing member is a sliding slider bearing that rotatably supports the guide member.

(19) Preferably, the axle bearing member is a ball bearing comprising an outer ring that contacts the guide member, an inner ring that contacts the support member, and a multiplicity of rolling bodies disposed between the outer ring and the inner ring.

(20) Preferably, a holding member that connects the guide member and the outer ring is provided between the guide member and the outer ring, and the holding member configures a part of the grease holding unit.

(21) Preferably, the water-repellent grease is also filled inside the axle bearing member.

(22) Preferably, the water-repellent grease is held in at least a portion of the space that leads to the guide member and at least one outer end surface of the axle bearing member in the rotary support shaft direction.

(23) Preferably, a lubricating grease that is different from the water-repellent grease is held on the other outer end surface of the axle bearing member in the rotary support shaft direction.

According to the present invention, it is possible to provide a line roller with a structure in which seawater, etc. cannot easily penetrate to the periphery of the axle bearing member.

Further, according to the present invention, it is possible to provide a spinning reel for fishing comprising a line roller in which the axle bearing member is sealed with a simple structure.

BRIEF DESCRIPTION OF THE DRAWINGS

Referring now to the attached drawings which form a part of this original disclosure.

DETAILED DESCRIPTION OF THE EMBODIMENTS

First Embodiment

The spinning reel for fishing and the line roller used therefor according to the first embodiment of the present invention will be described below with reference to the drawings. In the following description. "front" indicates the direction in which the fishing line is unreeled (cast), specifically, left in FIG. 1 and FIG. 2 refers to the "front."

Figure 1:
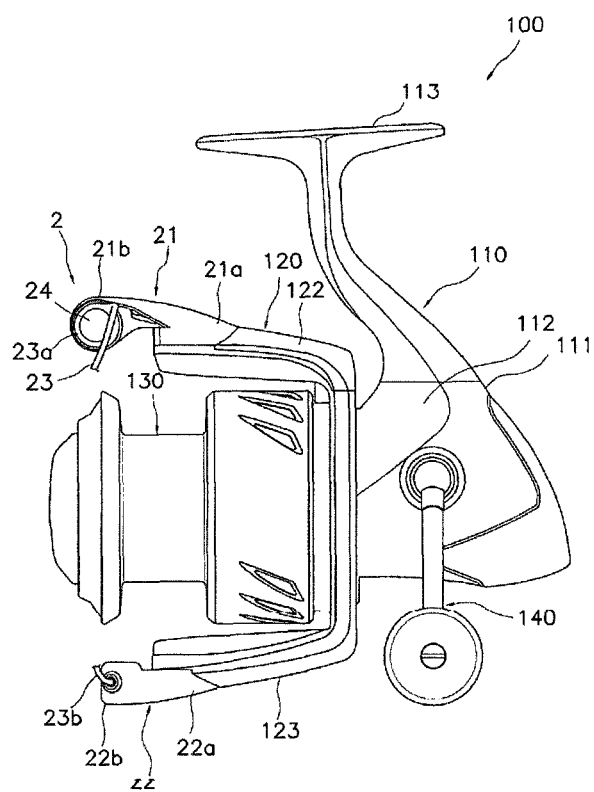
FIG. 1 is an overall view of a spinning reel for fishing according to an embodiment of the present invention.

As shown in FIG. 1, the spinning reel for fishing 100X) comprises a reel body 110, a rotor 120, a spool 130, a handle 140, and a fishing line guiding mechanism 2. Further, as shown in FIG. 2, the spinning reel for fishing 100 further comprises a drive mechanism 150, an oscillating mechanism 160, a pinion gear 170, and a spool shaft 180.

As shown in FIG. 1, the reel body 110 comprises a case part 111 and a lid portion 112. The lid portion 112 can be detached from the case part 111. Further, the case part 111 comprises a mounting portion 113 that extends in the longitudinal direction. The mounting portion 113 is a portion that is mounted to the fishing rod.

Figure 2:
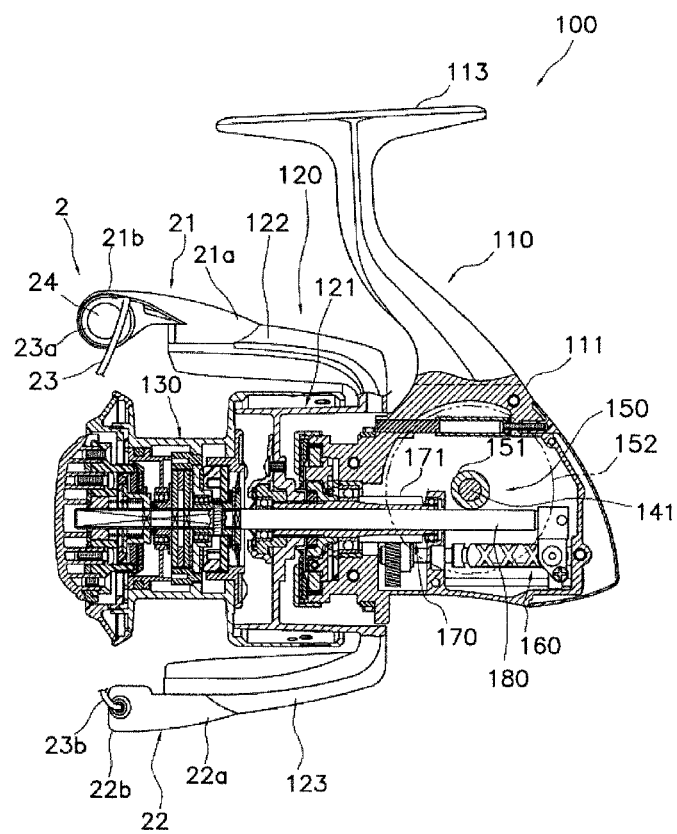
FIG. 2 is a cross-sectional view of the spinning reel for fishing shown in FIG. 1.

As shown in FIG. 2, the reel body 110 comprises an internal space that is defined by the case part 111 and the lid portion 112 and houses various mechanisms in the internal space. In particular, the drive mechanism 150 and the oscillating mechanism 160 are housed in the reel body 110.

The drive mechanism 150 comprises a drive shaft 151 and a drive gear 152. The drive shaft 151 is coupled to a handle shaft 141 and is integrally rotated with the handle shaft 141.

The drive gear 152 is coupled to the drive shaft 151, and is integrally rotated with the drive shaft 151. The drive gear 152 is a face gear and meshes with the gear portion 171 of the pinion gear 170. The drive shaft 151 and the drive gear 152 are rotated by rotating the handle 140 that is mounted to the side surface of the reel body 110, and the pinion gear 170 is also rotated.

The pinion gear 170 is disposed on the reel body 110. In particular, the pinion gear 170 extends forward from inside the reel body 110. The pinion gear 170 is rotatably disposed around the spool shaft 180. The pinion gear 170 is formed with a tubular shape, and the spool shaft 180 extends inside the pinion gear 170. The pinion gear 170 is supported by the reel body 110 via a multiplicity of axle bearing members.

The spool shaft 180 extends forward from inside the reel body 110. The spool shaft 180 is reciprocated in the longitudinal direction by rotating the handle 140. In particular, the rotation of the handle 140 rotates the pinion gear 170 via the drive gear 152. Accompanying the rotation of this pinion gear 170, the oscillating mechanism 160 reciprocates the spool shaft 180 in the longitudinal direction.

The spool 130 is a member on which the fishing line is wound. The spool 130 is supported on the distal end portion of the spool shaft 180. The spool 130 is integrally reciprocated with the spool shaft 180 in the longitudinal direction.

The rotor 120 is a member for winding the fishing line onto the spool 130. The rotor 120 is fixed to the front portion of the pinion gear 170, and is integrally rotated with the pinion gear 170. Therefore, the rotor 120 is non-rotatable relative to the pinion gear 170.

The rotor 120 comprises a rotor body 121, a first rotor arm 122, and a second rotor arm 123. The rotor body 121 has a cylindrical shape. The first rotor arm 122 and the second rotor arm 123 extend from the outer perimeter surface of the rotor body 121 toward the front. The first rotor arm 122 and the second rotor arm 123 are disposed in opposite positions in the circumferential direction of the rotor body 121.

Figure 3:
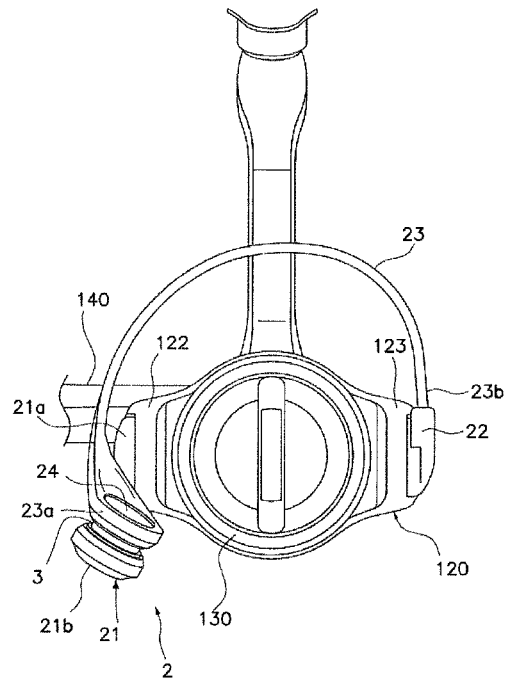
FIG. 3 is a front view of the spinning reel for fishing shown in FIG. 1.

FIG. 3 is a front view of a spinning reel. As shown in FIGS. 1-3, the fishing line guiding mechanism 2 is a mechanism to guide the fishing line to the spool 130. The fishing line guiding mechanism 2 is attached to the distal end portions of the first rotor arm 122 and the second rotor arm 123.

The fishing line guiding mechanism 2 is pivotably mounted to assume the line guiding orientation and the line casting orientation. This fishing line guiding mechanism 2 comprises a first bail support member 21 and a second bail support member 22, a bail 23, a support shaft (support member) 24, and a line roller 3.

The first bail support member 21 is pivotably mounted to the first rotor arm 122. Specifically, the first bail support member 21 is pivotably mounted to the outside of the distal end portion of the first rotor arm 122.

The second bail support member 22 is pivotably mounted to the second rotor arm 123. Specifically, the second bail support member 22 is pivotably mounted to the outside of the distal end portion of the second rotor arm 123.

Figure 4:
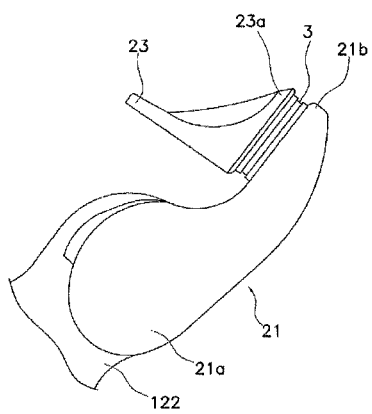
FIG. 4 is a partially enlarged view of the fishing line guiding mechanism of the spinning reel for fishing shown in FIG. 1.

FIG. 4 is a partial enlarged view of the fishing line guiding mechanism 2. As shown in FIG. 4, the first bail support member 21 comprises a first end portion 21a and a second end portion 21b. The first end portion 21a is pivotably mounted to the first rotor arm 122. The second end portion 21b of the first bail support member 21 supports the first end portion 23a of the bail 23 via the support shaft 24 (refer to FIG. 5).

As shown in FIG. 1 and FIG. 2, the second bail support member 22 comprises a first end portion 22a and a second end portion 22b. The first end portion 22a is pivotably mounted to the second rotor arm 123. The second end portion 22b supports the second end portion 23b of the bail 23.

As shown in FIG. 3, the bail 23 is an essentially U-shaped member made of stainless steel alloy. The bail 23 is curved to protrude outwardly along the outer perimeter surface of the spool 130. This bail 23 comprises a cover portion 23a at the first end portion.

This cover portion 23a is supported to the first bail support member 21 via the support shaft 24. Further, the second end portion 23b of the bail 23 is supported to the second bail support member 22. When the fishing line guiding mechanism 2 returns to the line guiding orientation from the line releasing orientation, the bail 23 guides the fishing line to the line roller 3 via the cover portion 23a. The line roller 3 is a member for guiding the fishing line to the spool 130 of the spinning reel for fishing 100.

Figure 5:
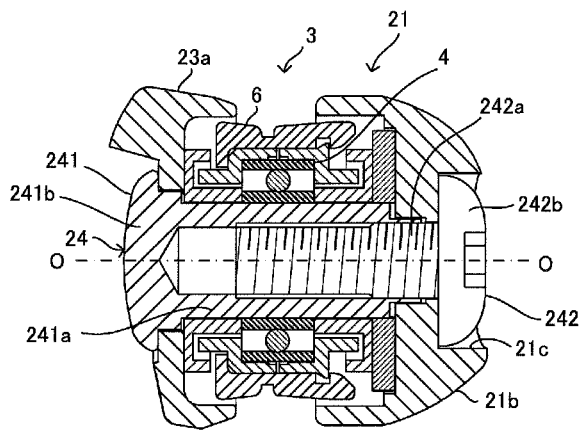
FIG. 5 is a partial cross-sectional view of the fishing line guiding mechanism of the spinning reel for fishing shown in FIG. 1.

FIG. 5 is a cross-sectional view of the fishing line guiding mechanism 2 comprising the line roller 3. The line roller 3 is configured such that the guide member 6 is rotatably supported around the support shaft 24 by the axle bearing member 4, with respect to the stationary support shaft 24. The fishing line is guided to the spool 130 by the rotating guide member 6. It should be noted that in the following explanation, the axial direction means the direction in which the rotational axis O of the line roller 3 (axle bearing member 4) extends. That is, the axial direction means the direction in which the supporting shaft 24 extends, and in FIG. 5, the left and right direction is the axial direction. Further, the radial direction means the radial direction of a circle centered on the rotational axis O. In addition, the circumferential direction means the circumferential direction of a circle centered on the rotational axis O.

As shown in FIG. 5, a through-hole 21c is formed at the second end portion 21b of the first bail support member 21. The through-hole 21c is a stepped through-hole. A support shaft 24 extends through this through-hole 21c.

The support shaft 24 extends between the first bail support member 21 and the cover portion 23a of the bail 23. The support shaft 24 comprises a tubular portion 241 and a bolt portion 242. The tubular portion 241 comprises a shaft portion 241a and a head portion 241b. The shaft portion 241a has a cylindrical shape, and a female-threaded portion is formed on the inner perimeter surface. The head portion 241b has a larger diameter than the shaft portion 241a. With the head portion 241b abutting the cover portion 23a, the movement of the tubular portion 241 in the axial direction is regulated.

The bolt portion 242 comprises a shaft portion 242a and a head portion 242b. The shaft portion 242a has a cylindrical shape, and a male-threaded portion is formed on the outer perimeter surface. Accordingly, the bolt portion 242 screws into the tubular portion 241. The head portion 242b has a larger diameter than the shaft portion 242a With the head portion 242*b* abutting the second end portion 21*b* of the first bail support member 21, the movement of the bolt portion 242 in the axial direction is regulated.

Figure 6:
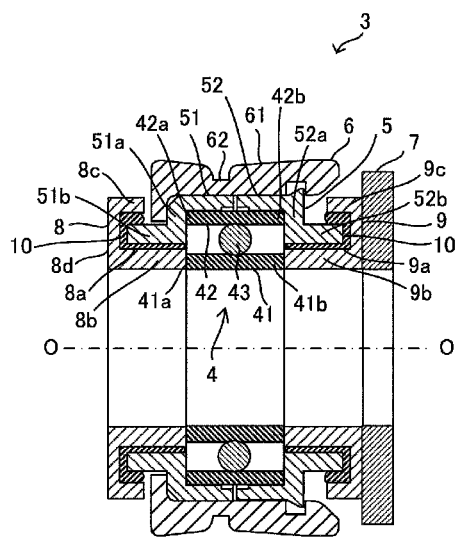
FIG. 6 is a cross-sectional view of the line roller according to the first embodiment of the present invention.

As shown in FIG. 6, the line roller 3 comprises an axle bearing member 4, a holding member (collar member) 5, and a guide member 6. Further, the line roller 3 comprises a regulating member 7, a first grease holding unit forming member 8, and a second grease holding unit forming member 9. Moreover, the line roller 3 is formed in an annular shape centered on the axis O, and is vertically symmetrical with respect to the axis O on a cross-sectional view that is parallel to the axis O, as shown in FIG. 6; the reference symbols used in the following description are provided in the upper half of the figure relative to the axis O. In addition, there are cases in which the right direction or the left direction in the figure is referred to as axially outward. The same applies to the following cross-sectional view.

The axle bearing member 4 comprises an inner ring 41, an outer ring 42, and a multiplicity of rolling bodies 43. The inner ring 41 has a cylindrical shape. The support shaft 24 is fitted in the inner ring 41. Accordingly, the inner ring 41 does not rotate relative to the support shaft 24.

The outer ring 42 has a cylindrical shape and has a larger diameter than the inner ring 41. The outer ring 42 is disposed radially outwardly with respect to the inner ring 41. Each rolling body 43 is disposed between the inner ring 41 and the outer ring 42. Each rolling body 43 is disposed at an interval from each other in the circumferential direction. The inner ring 41 and the outer ring 42 are formed from a metal, for example, stainless steel. The outer ring and the guide member 6 are connected via the holding member 5. The inner ring 41 is fitted to the support shaft 24, and is fixedly supported so as to not rotate relative to the support shaft 24.

The holding member (collar member) 5 comprises a first holding member 51 and a second holding member 52 which are arranged in the axial direction. The holding member 51 and the second holding member 52 are separate members. The first holding member 51 comprises a first shoulder portion 51*a* and the second holding member 52 comprises a second shoulder portion 52*a*. The holding member 5, that is, the first and second holding members 51, 52, are preferably made of synthetic resin. Although not particularly limited thereto, for example, the first and second holding members 51 and 52 are formed by POM (polyacetal) resin.

The holding member 5 abuts both ends of the outer perimeter of the outer ring 42. Specifically, the first shoulder portion 51*a* and the second shoulder portion 52*a* of the holding member 5 are formed in a plate shape in the radial direction, the inner perimeter of the first shoulder portion 51*a* abuts the first end 42*a* of the outer ring 42, and the inner perimeter of the second shoulder portion 52*a* abuts the second end 42*b* of the outer ring 42.

The first holding member 51 comprises a first seal portion 51*b*. The first seal portion 51*b* is an annular protrusion (annular protrusion) that extends axially to the left of the outer ring 42 from the lower end of the first shoulder portion 51*a*. Similarly, the second holding member 52 comprises a second seal portion 52*b*. The second seal portion 52*b* is an annular protrusion (annular protrusion) that extends axially to the right of the outer ring 42 from the lower end of the second shoulder portion 52*a* That is, the first seal portion 51*b* and the second seal portion 52*b* extend in symmetrically opposite directions, i.e., on both sides of the axle bearing member 4.

When the first holding member 51 and the second holding member 52 are mounted to the axle bearing member 4, the inner perimeter surface of the first holding member 51 and the second holding member 52 engage with the outer perimeter surface of the outer ring 42 of the axle bearing member 4, and the first holding member 51 and the second holding member 52 are integrally rotated with the outer ring 42.

As described above, the guide member 6 is rotated about the axle bearing member 4. Accordingly, there is a space that leads from the axle bearing member 4 to the guide member 6 (the outer perimeter part thereof, the outer space of the line roller 3) in the periphery of the axle bearing member 4. Seawater, etc. reaching the axle bearing member 4 through this space causes a reduction in the function of the axle bearing member 4. Thus, in order that seawater, etc. not reach the axle bearing member 4, this space is formed as a narrow passageway (labyrinth), and grease holding units that hold water-repellent grease 10 are formed in two locations in the passage space, i.e., on both sides of the axle bearing member 4. The grease holding units in the two locations are respectively configured from the first grease holding unit forming member 8 and the first seal portion 51*b* of the first holding member 51, and the second grease holding unit forming member 9 and the second seal portion 52*b* of the second holding member 52.

The first grease holding unit forming member 8 is configured from a tubular portion (annular protrusion) 8*b* that is formed in the circumferential direction, a tubular portion (annular protrusion) 8*c* that is formed in the circumferential direction at an interval from the tubular portion 8*b* in the radial direction, and a flat plate portion 8*d* that connects the tubular portion 8*b* and the tubular portion 8*c* in the radial direction. The tubular portion 8*c* extends from the flat plate portion 8*d* in the direction of the guide member 6, but is configured so as to not abut the guide member 6. The first grease holding unit forming member 8 is preferably made of synthetic resin. The first grease holding unit forming member 8 configures the grease holding unit along with the first seal portion 51*b*.

Specifically, the first grease holding unit forming member 8 comprises an annular depression (annular recess) 8*a* between the tubular portion 8*b* and the tubular portion 8*c*. The depression 8*a* has a shape that is complementary to the first seal portion 51*b* of the first holding member 51. The first seal portion 51*b* is opposed to the depression 8*a*, but does not abut the flat plate portion 8*d*. That is, the first seal portion 51*b* is opposed to the annular recess 8*a* with a dimensional configuration that has a labyrinthine space (gap) having a U-shaped cross section. Water-repellent grease 10 is held in this space 8*a*.

Since the water-repellent grease 10 is held in the narrow space 8*a* and has a high consistency, the grease will not flow out of the end portion of the annular recess 8*a* on the guide member 6 side.

In addition, the water-repellent grease 10 is also applied to the outside surface of the axle bearing member 4. Since the water-repellent grease 10 does not absorb but repels seawater, etc. with which it comes in contact, the grease provides water repellency to the outside surface of the axle bearing member 4. Further, since the water-repellent grease 10 is held in the passage space from the outside of the line roller 3 to the axle bearing member 4, it is possible effectively to prevent seawater, etc. that tries to enter from the outside of the line roller 3 from reaching the outer surface of the axle bearing member 4.

The end portion of the tubular portion 8*b* on the axle bearing member 4 side abuts the first end 41*a* of the inner ring 41 of the axle bearing member 4. That is, the first grease holding unit forming member 8 also plays the role of a regulating member that regulates the position of the axle bearing member 4 from the left in FIG. 6.

The second grease holding unit forming member 9 made of synthetic resin is disposed on the opposite side of the first grease holding unit forming member 8 across the axle bearing member 4. The second grease holding unit forming member 9 is formed symmetric with the first grease holding unit forming member 8 relative to a plane that is perpendicular to the axis O.

The end of the tubular portion 9b of the second grease holding unit forming member 9 abuts the second end 41b of inner ring 41 the axle bearing member 4. Further, a regulating member 7 is disposed to abut the opposite side of the side of the second grease holding unit forming member 9 that abuts the axle bearing member 4. The regulating member 7 regulates the position of the axle bearing member 4 along with the second grease holding unit forming member 9 from the right in FIG. 6.

In the same way as the first grease holding unit forming member 8, the second grease holding unit forming member 9 forms an annular depression (annular recess) 9a from the tubular portion (annular protrusion) 9b and the tubular portion (annular protrusion) 9c. The depression 9a has a shape that is complementary to the second seal portion 52b of the second holding member 52. The second seal portion 52b is opposed to the annular recess 9a so as to form a labyrinthine space (gap) having a U-shaped cross section. Water-repellent grease 10 is held in this space 9a. As described above, the second grease holding unit forming member 9 configures the grease holding unit that holds water-repellent grease 10 along with the second seal portion 52b.

Since the water-repellent grease 10 is held in the narrow space 9a and has a high consistency, the grease will not flow out of the end portion of the annular recess 9a on the guide member 6 side.

In addition, the water-repellent grease 10 is also applied to the outside surface of the axle bearing member 4 to provide water repellency to the outside surface of the axle bearing member 4.

Water-repellent grease 10 does not absorb but repels water when coming into contact with seawater or river water. Thus, even if seawater, etc. enters the narrow passage spaces 8a, 9a, the seawater, etc. is blocked by the water-repellent grease 10 and cannot penetrate further.

Well-known water-repellent grease 10 may be used. For example, fluorine grease, silicone grease, and silicon grease may be used. Fluorine grease can be obtained, for example, by adding a thickener such as polytetrafluoroethylene (PTFE) to a fluorine oil having perfluoropolyether as the main component. Silicone grease can be obtained, for example, by adding a thickener such as metal soap to a silicone oil having polysiloxane as the main component. Silicon grease is obtained by adding a thickener such as silica fume to silicone oil.

As shown in FIG. 6, the guide member 6 has a cylindrical shape. In particular, the guide member 6 is a cylindrical member centered on the axis O, and a concavo/convex structure is formed so as to stably guide the fishing line thereto as well as to engage with the holding member 5. While not particularly limited thereto, the guide member 6 can be made of metal, for example. The guide member 6 is formed from stainless steel.

The guide member 6 is disposed on the outer perimeter side of the holding member 5 and covers the outer perimeter surface of the holding member 5. That is, the holding member 5 is inserted in the guide member 6. The guide member 6 is engaged with the holding member 5 in a state in which the holding member 5 is inserted in the guide member 6. That is, the guide member 6 is engaged with the holding member 5 so as to not move in the axial direction relative to the holding member 5.

The guide member comprises a guide surface 61 on the outer perimeter which guides the fishing line. Specifically, an annular groove 62 that extends in the circumferential direction is formed on the guide surface 61. In particular, this groove 62 is formed in a position that is further on the first holding member 51 side than the center of the guide surface 61 in the axial direction. The guide surface 61 is inclined from both ends toward the groove 62 so as to guide the fishing line to the groove 62.

In the line roller 3 having the structure described above, a grease holding unit configured from the first grease holding unit forming member 8 and the first seal portion 51b is configured in the periphery of the axle bearing member 4, and water-repellent grease 10 is held therein. In addition, a grease holding unit configured from the second grease holding unit forming member 9 and the second seal portion 52b is formed, and water-repellent grease 10 is held therein. Since these grease holding units form narrow spaces that are bent into the form of a U, the effect of holding the water-repellent grease 10 is high. Accordingly, it is possible to effectively prevent seawater from penetrating to the periphery of the axle bearing member 4 from outside of the line roller 3, and to suppress problems in the axle bearing member 4 caused by seawater, etc.

Second Embodiment

A line roller 3 in which the axle bearing member 4 comprises one axle bearing was described above as the first embodiment. However, the axle bearing is not limited to one and may comprise two or more axle bearings. A line roller 3A according to the second embodiment of the present invention comprising two axle bearings will be described below using FIGS. 7A and 7B. Members that are common to the first embodiment are given the same reference symbols, and the following description will focus on those portions that are different from the line roller 3 of the first embodiment.

Figure 7A:
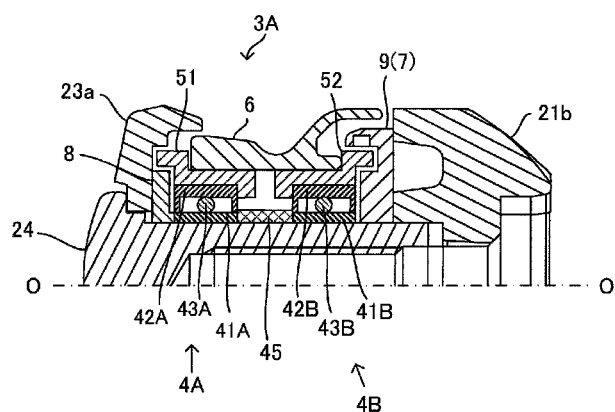
FIG. 7A is a cross-sectional view of the line roller and the peripheral members according to the second embodiment of the present invention.

As shown in FIG. 7A, the line roller 3A comprises two ball bearings (axle bearing member) 4A, 4B on the outer perimeter of the support shaft 24, a regulating member 45, a first grease holding unit forming member 8, a second grease holding unit forming member 9, a first holding member (collar member) 51, a second holding member (collar member) 52, and a guide member 6. Water-repellent grease is now shown in FIG. 7(a).

The axle bearing member 4A comprises an inner ring 41A and an outer ring 42A, and holds a multiplicity of rolling bodies 43A therebetween. The axle bearing member 4B comprises an inner ring 41B and an outer ring 42B, and holds a multiplicity of rolling bodies 43B therebetween. Meanwhile, the axle bearing members 4A, 4B are closed type ball bearings in which the sides are closed.

Figure 7B:
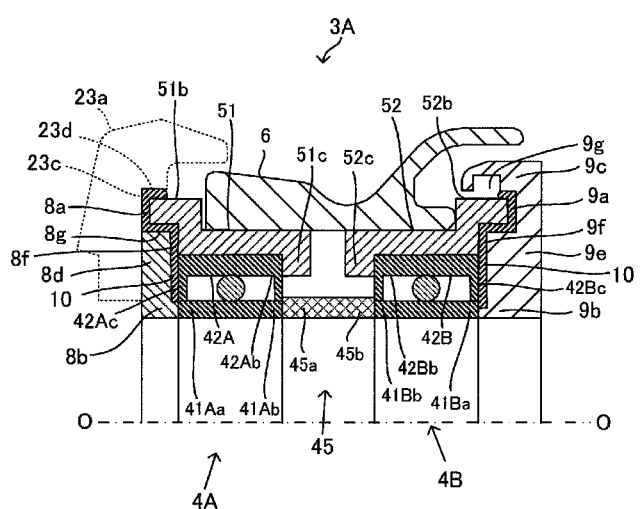
FIG. 7B is an enlarged cross-sectional view of the line roller.

As shown in FIG. 7B, a first end 41Aa of the inner ring 41A of the axle bearing member 4A abuts the tubular portion 8b of the first grease holding unit forming member 8. A second end 41Ab of the inner ring 41A abuts the first end 45a of the regulating member 45. A first end 41Ba of the inner ring 41B of the axle bearing member 4B abuts the tubular portion 9b of the second grease holding unit forming member 9. In addition, a second end 41Bb of the inner ring 41B abuts the second end 45b of the regulating member 45.

That is, the positions of axle bearing members 4A, 4B are regulated by the first grease holding unit forming member 8 and the second grease holding unit forming member 9 on both sides, and the regulating member 45 in the middle.

The outer perimeter of the outer ring 42A engages with the inner perimeter of the first holding member 51. An axially inner end 51c of the first holding member 51 extends in the inner perimeter direction, and abuts the second end 42Ab of the outer ring 42A. The end of the first holding member 51 on the opposite side of the end 51c extends from the axially outer end surface of the outer ring 42A in the outer perimeter direction and is further bent outwardly in the axial direction to form an annular protrusion 51b.

The outer perimeter of the outer ring 42B is engaged with the inner perimeter of the second holding member 52. An axially inner end 52c of the second holding member 52 extends in the inner perimeter direction and abuts the second end 42Bb of the outer ring 42B. The end of the second holding member 52 on the opposite side of the end 52c extends from the axially outer end surface of the outer ring 42B in the outer perimeter direction and is further bent outwardly in the axial direction to form an annular protrusion 52b.

The inner perimeter of the guide member 6 is engaged with the outer perimeters of the first holding member 51 and the second holding member 52. The guide member 6 is thus rotated along with the outer rings 42A, 42B of the axle bearing members 4A, 4B via the first holding member 51 and the second holding member 52.

The first grease holding unit forming member 8 is configured from a tubular portion (annular protrusion) 8b that contacts the support shaft 24 and from a flat plate portion 8d that extends from the tubular portion 8b in the radial direction. The axial width of the flat plate portion 8d is smaller than the tubular portion 8b. Therefore, a gap (space) 8f is formed between the flat plate portion 8d and the first holding member 51 as well as the axle bearing member 4A.

The axially outward end of the first grease holding unit forming member 8 abuts a recess 23c that is provided on the inner side of the first end 23a of the bail 23. A space (annular recess 8a) is formed between the outer perimeter 8g of the flat plate portion 8d and a wall portion 23d of the recess 23c The annular protrusion 51b of the first holding member 51 is opposed to this annular recess 8a so as to form a gap (space formed by the annular recess 8a and the annular protrusion 51b) 8a.

Water-repellent grease 10 is held in the gap 8f and the gap 8a. The water-repellent grease 10 that is held in the gap 8f is held so as to contact the outer side surface 42Ac of the outer ring 42A of the axle bearing member 4A, to prevent seawater, etc., from reaching the surface of the axle bearing member 4A.

The second grease holding unit forming member 9 is provided with a tubular portion (annular protrusion) 9b that contacts the support shaft 24, and a tubular portion (annular protrusion) 9c that is formed at an interval in the radial direction from the tubular portion 9b. The space between the tubular portion 9b and the tubular portion 9c is connected by a flat plate portion 9e. A depression (annular recess) 9a is formed on the tubular portion 9c side of the flat plate portion 9e. The annular protrusion 52b of the second holding member 52 is disposed to oppose the annular recess 9a so as to form a gap (a space formed by the annular recess 9a and the annular protrusion 52b) 9a In addition, a gap 9f is formed between the axle bearing member 4B and the axial surface of the flat plate portion 9e excluding the annular recess 9a. Water-repellent grease 10 is held in the gap 9f and the gap 9a. The water-repellent grease 10 that is held in the gap 9f is held so as to make contact with the outer side surface 42Bc of the outer ring 42B to prevent seawater, etc. from reaching the surface of the axle bearing member 4B.

The tubular portion 9c is disposed on the outermost perimeter side of the second grease holding unit forming member 9, and a grease receiving part 9g is formed on the inner perimeter thereof. The water-repellent grease 10 is prepared to have sufficient consistency so as to not flow out under conditions of normal use. However, since a strong centrifugal force acts on the line roller in the upward direction if FIG. 7B, it is possible that a portion thereof will flow out. The grease receiving part 9g is a space for receiving the grease in the unlikely event that the water-repellent grease 10 flows out. Such a grease receiving part 9g may be provided on the first grease holding unit forming member 8 side as well.

The line roller 3A having the structure described above comprises a grease holding unit in which a narrow, bent space (labyrinth) is formed in the periphery of the axle bearing members 4A, 4B, thereby having the significant effect of holding the water-repellent grease 10. Thus, it is possible effectively to prevent seawater, etc. from penetrating to the periphery of the axle bearing members 4A, 4B from outside of the line roller 3A and to suppress problems in the axle bearing members 4A, 4B caused by seawater, etc.

Although embodiments of the present invention have been presented heretofore, the present invention is not limited thereto, and various modifications may be made without departing from the scope of the present invention. In addition, the material of each member is not limited to the examples, well-known materials having the necessary function and durability may be used as is appropriate.

Modified Example 1

In the first embodiment, the first grease holding unit forming member 8 and the second grease holding unit forming member 9 were configured as single annular recessed members. However, the configuration of the first and the second grease holding unit forming members 8, 9 is not limited thereto and may be configured from a multiplicity of members.

Figure 8:
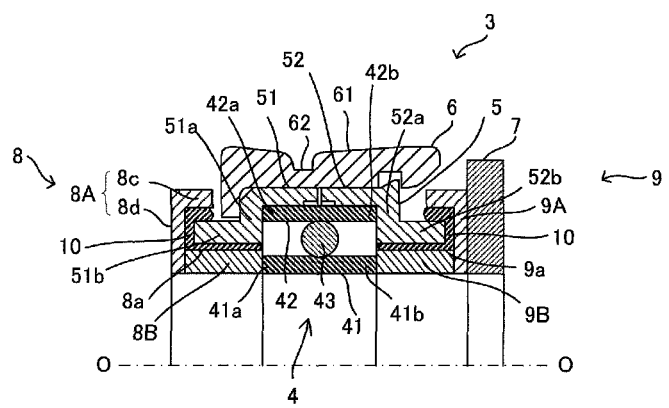
FIG. 8 is an enlarged cross-sectional view of the line roller according to a first modified example of the present invention.

As shown in FIG. 8, in a line roller 3 according to the first modified example, the annular recess 8a of the first grease holding unit forming member 8 is formed by abutting a tubular member 8B formed in the periphery of the support shaft 24 against a member 8A comprising a tubular portion 8c and a flat plate portion 8d that extends in the radial direction.

The spacing between the tubular portion 8c and the tubular member 8B, and the axial length of the tubular member 8B, are configured to have dimensions in which, when the first seal portion 51b is opposed to the annular recess 8a, a gap (space formed by the annular recess 8a and the first seal portion 51b) 8a is formed between the two. Water-repellent grease 10 is held in this space 8a. Moreover, the tubular member 8B also serves as a regulating member that regulates the position of the axle bearing member 4. Further, the second grease holding unit forming member 9 uses the same configuration. That is, a member 9A and a tubular member 9B are combined to configure a gap (annular recess 9a), which is opposed to the second seal portion 52b, and water-repellent grease 10 is held in the gap (space formed by the annular recess 9a and the second seal portion 52b) 9a thereof. The same effect as the first embodiment can also be obtained by such a configuration.

In the first modified example, the manufacture of the first and second grease holding unit forming members 8, 9 becomes easier compared to the first embodiment, and it is possible to form a grease holding unit at low cost. For example, the member 8A may be manufactured as a pressing member and the tubular member 8B may be manufactured as a cutting member, which can be manufactured at lower cost than a first grease holding unit forming member 8 that is formed by integral molding or milling.

Modified Example 2

Figure 9:
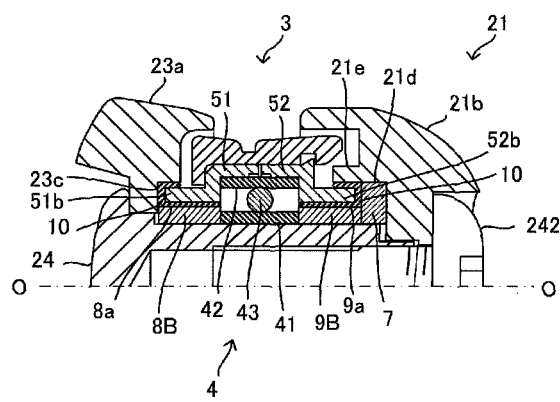
FIG. 9 is an enlarged cross-sectional view of the line roller according to a second modified example of the present invention.

Portions of the first end 23a of the bail 23 and the second end 21b of the first ball support member 21 may by combined as the structure of the first and second grease holding unit forming members 8, 9. In the second modified example, as shown in FIG. 9, a recess 23c is formed on the inner side of the first end 23a of the bail 23. A tubular member 8B is disposed so as to contact the end of the recess 23c. An annular recess 8a is formed between the recess 23c and the outside surface of the tubular member 8B. The first end 23a and the tubular member 8B are configured so that when this annular recess 8a and the first seal portion 51b of the first holding member 51 are opposed, a gap (space) is generated between the two. Water-repellent grease 10 is held in this space.

Further, a projection 21e is formed on the inner side of the second end 21b of the first bail support member 21, and a recess 21d is formed further on the inner side thereof. A regulating member 7 is disposed abutting the side surface of the recess 21d, and a tubular member 9B that is formed contacting the support shaft 24 is disposed sandwiched between the regulating member 7 and the inner ring 41 of the axle bearing member 4. The region surrounded by the projection, the regulating member 7, and the tubular member 9B becomes the annular recess 9a. Water-repellent grease 10 is held in the gap (space) that is formed by opposing the annular recess 9a and the second seal portion 52b The same effect as that of the first embodiment can also be obtained by such a configuration.

In the second modified example, the member 8A and the member 9A can be omitted compared with the first modified example by changing a part of the structures of the first end 23a of the bail 23 and the second end 21b of the first bail support member 21, so that it is possible further to reduce the manufacturing cost.

Modified Example 3

In the first embodiment, a grease holding unit was configured by forming an annular recess. However, the structure of the grease holding unit is not limited thereto. For example, one or multiple annular protrusions (members) may be disposed adjacent to each other with gaps (space) therebetween in a mutually opposing direction in the axial direction, and the water-repellent grease 10 may be held in this space (not shown).

In the first embodiment, a gap (space) that is bent in a U-shape was formed and the water-repellent grease 10 was held therein; however, it is not necessary for the gap to be bent into the form of a U. As described above, the configuration may be such that water-repellent grease 10 is held in a linear gap (space) of the two annular protrusions. In addition, a protruding member and a recessed member or the like may be combined so that the gap is bent into the form of a crank. In this case as well, a bail member and a bail support member may be used.

Modified Example 4

In the first and the second embodiments, the grease holding unit is configured by forming an annular protrusion that extends in the rotational shaft direction of the axle bearing member 4 and an annular recess that is depressed in the axial direction. However, the invention is not limited thereto; an annular protrusion and an annular recess may be formed in a direction that is perpendicular to the axial direction (radial direction) and combined.

Modified Example 5

In the first and the second embodiments, the grease holding unit is configured by forming an annular recess and an annular protrusion. However, the grease holding unit is not limited thereto.

Figure 10:
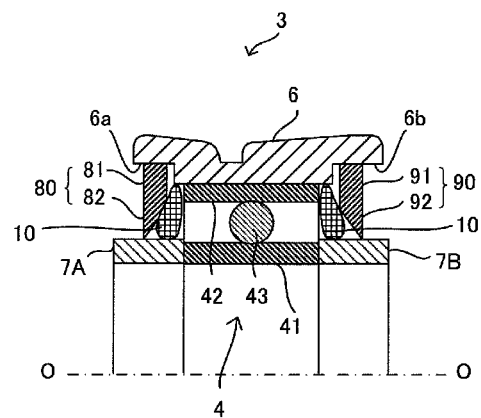
FIG. 10 is an enlarged cross-sectional view of the line roller according to a fifth modified example of the present invention.

In the line roller 3 according to the fifth modified example shown in FIG. 10, water-repellent grease 10 is held by forming lip seals 80, 90 made of an elastic member on both sides of the axle bearing member 4. The lip seals 80, 90 may be formed from synthetic rubber or natural rubber; specifically, from nitrile-butadiene rubber, which is a copolymer of butadiene and acrylonitrile.

The line roller 3 according to the fifth modified example is not provided with a holding member 5 between the guide member 6 and the axle bearing member 4. The lip seal 80 comprises a fixed portion 81, which is fixed to a stepped portion 6a that is formed at one end of the guide member 6, and a lip portion 82 in which the thickness becomes thinner from the fixed portion 81 toward the distal end portion. The lip seal 90 comprises a fixed portion 91, which is fixed to a stepped portion 6b that is formed at the other end of the guide member 6, and a lip portion 92 in which the thickness becomes thinner from the fixed portion 91 toward the distal end portion.

The tips of the lip portions 82, 92 are respectively in contact with regulating members 7A, 7B that regulate the position of the axle bearing member 4. Water-repellent grease 10 is held between the lip seal 80 and the axle bearing member 4, as well as between the lip seal 90 and the axle bearing member 4. It is possible to prevent seawater, etc. from reaching the axle bearing member 4 with this structure.

Moreover, the lip portions 82, 92 may be configured to contact the support member 24 directly, without providing regulating members 7A, 7B. Further, the lip seals 80, 90 may be configured so that the fixed portions 81, 91 are fixed to the regulating members 7A, 7B (or the support member 24), and so that the lip portions 82, 92 are oriented in the direction of the guide member 6. Further, a holding member 5 may be provided, and the lip seals 80, 90 may be fixed to the holding member 5 (both not shown).

Modified Example 6

In the first and second embodiments, a ball bearing is used as the axle bearing member 4. However, the axle bearing member 4 is not limited thereto. For example, a sliding slider bearing may be used as the axle bearing member 4.

Figure 11:
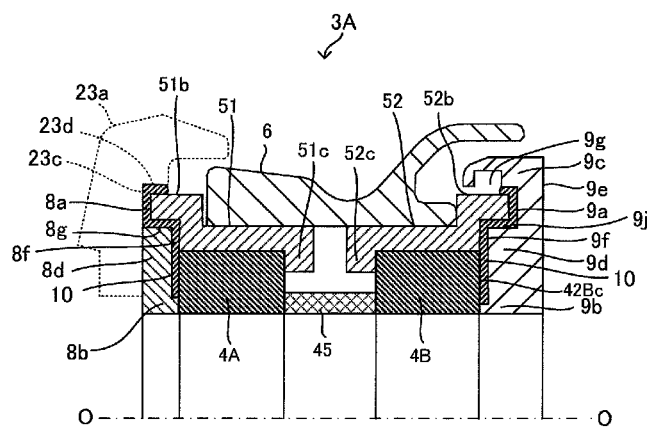
FIG. 11 is an enlarged cross-sectional view of the line roller according to a sixth modified example of the present invention.

The axle bearings 4A, 4B of the line roller 3A of the sixth modified example shown in FIG. 11 are annular slider bearings. The guide member 6 slides and rotates on the outer perimeter surfaces of the axle bearings 4A, 4B integrally with the first and the second holding members 51, 52, which couple the guide member 6 and the axle bearings 4A, 4B. The axle bearings 4A, 4B may be made of metal or synthetic resin, synthetic resin being preferable. In addition, an axle bearing in which the first and the second holding members 51, 52 are easily slid without using a lubricant such as an oil film is preferable from the standpoint of maintenance. For example, self-lubricating resin such as polytetrafluoroethylene resin or polyacetal resin may be used as the synthetic resin for the slider bearings.

In addition, the first and the second holding members 51, 52 may be not provided between the axle bearings 4A. 4B and the guide member 6 (not shown). In this case, a synthetic resin layer may be disposed on the inner perimeter of the metal guide member 6 so that the synthetic resin axle bearings 4A. 4B are slid. Further, a metal guide member 6 and metal axle bearings 4A, 4B may be combined. In addition, a metal guide member 6 and synthetic resin axle bearings 4A, 4B may be combined.

Modified Example 7

In the embodiment described above, a grease holding space may be provided to further improve the holding performance of the grease. A seventh modified example in which a grease holding unit is provided to the line roller 3A according to the second embodiment will be described with reference to FIG. 12.

Figure 12:
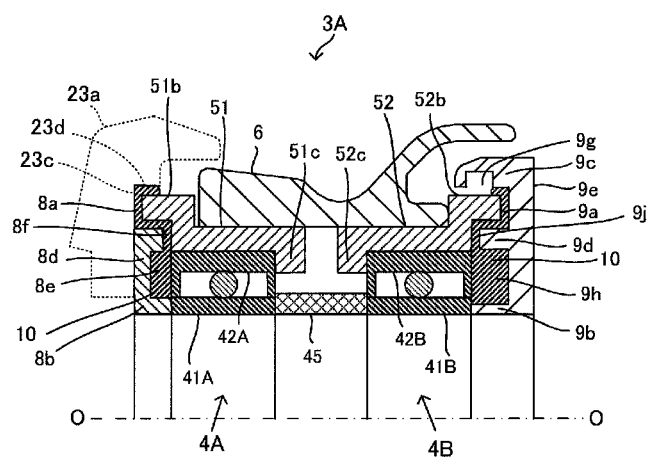
FIG. 12 is an enlarged cross-sectional view of the line roller according to a seventh modified example of the present invention.

As shown in FIG. 12, in the first grease holding unit forming member 8, a grease holding portion (holding space) 8e, a depression, is provided in a position of the flat plate portion 8d that faces the outer side surface of the outer ring 42A of the axle bearing member 4A. Water-repellent grease 10 is held in the grease holding portion 8e, the gap 8f, and the gap 8a. By providing the grease holding portion 8e, the retention force of the grease is further improved with respect to the centrifugal force that acts in the upward direction of the figure.

In addition, on the second grease holding unit forming member 9 side as well, a grease holding portion (holding space) 9h, a depression, is provided in a position of the Step 9d that faces the outer side surface of the outer ring 42B of the axle bearing member 4B. Water-repellent grease 10 is held in the grease holding portion 9h, the gap 9j, and the gap 9a. By providing the grease holding portion 9h, the retention force of the grease is further improved with respect to the centrifugal force that acts in the upward direction of the figure.

Modified Example 8

In a type of line roller 3A in which two axle bearing members 4A, 4B are disposed, as in the second embodiment, grease dedicated to lubrication may be disposed between the two axle bearing members 4A, 4B (not shown). While water-repellent grease 10 is held on both sides of the axle bearing members 4A, 4B, the water-repellent grease 10 is grease with an emphasis on water repellency for preventing seawater, etc. from entering. Thus, by disposing grease dedicated to lubrication between the axle bearing members 4A. 4B, the line roller can be configured to prevent seawater, etc from penetrating to the periphery of the axle bearing members 4A, 4B, as well as to improve lubricity.

Furthermore, if the axle bearing members 4A. 4B are ball bearings, lubricating grease may be filled inside the ball bearings as well. The lubricity of the axle bearing members 4A, 4B can be further increased with this configuration.

Moreover, water-repellent grease 10 may be held by application to the side surface or the outer perimeter surface of the axle bearing members 4, 4A, 4B as well. In addition, the water-repellent grease 10 may be filled in a portion or across the entirety, from the side surface or the outer perimeter surface of the axle bearing members 4, 4A, 4B to the inside of the grease holding unit.

Furthermore, the water-repellent grease 10 may be applied not only to the outside of the axle bearing members 4A, 4B, but the water-repellent grease 10 may be filled inside the axle bearing members 4A, 4B as well. The water repellency of the axle bearing members 4A. 4B can be further increased with this configuration.

What is claimed is:

1. A line roller for guiding a fishing line to a spool of a spinning reel for fishing, comprising:
    a cylindrical guide member comprising a guide surface configured to guide the fishing line on an outer perimeter of the cylindrical guide member;
    an axle bearing member rotatably supporting an inner perimeter surface of the guide member;
    a support member supporting the axle bearing member; and
    a grease holding unit forming a space leading from the axle bearing member to the guide member and holding a water-repellent grease in the space.
2. The line roller recited in claim 1, wherein
    the grease holding unit comprises a seal member made of an elastic member disposed between the guide member and the support member.
3. The line roller recited in claim 2, wherein
    the seal member comprises
    a fixed portion fixed to one of the guide member and the support member, and
    a lip portion extending from the fixed portion toward the other of the guide member and the support member, and in which a thickness of a distal end portion of the lip portion is thinner than a thickness of the fixed portion.
4. The line roller recited in claim 1, wherein
    the grease holding unit comprises
    a first annular protruding member having an annular protrusion projecting in the axial direction or a radial direction of a rotation of the axle bearing member, and
    a second annular protruding member having an annular protrusion projecting adjacently in a direction that opposes the annular protrusion.
5. The line roller recited in claim 1, wherein
    the grease holding unit comprises
    an annular protruding member having an annular protrusion projecting in an axial direction or a radial direction of a rotation of the axle bearing member, and
    an annular recessed member having an annular recess that is recessed complementarily to the annular protrusion.
6. The line roller recited in claim 1, wherein
    the axle bearing member is a sliding slider bearing rotatably supporting the guide member.
7. The line roller recited in claim 1, wherein
    the axle bearing member is a ball bearing comprising an outer ring contacting the guide member, an inner ring contacting the support member, and a plurality of rolling bodies disposed between the outer ring and the inner ring.
8. The line roller recited in claim 7, wherein
    a holding member connecting the guide member and the outer ring is disposed between the guide member and the outer ring, and the holding member forms a part of the grease holding unit.

9. The line roller recited in claim 7, wherein
an interior of the axle bearing member is configured to include the water-repellent grease.

10. The line roller recited in claim 1, wherein
the water-repellent grease is held in at least a portion of the space that leads to the guide member and at least one outer end surface of the axle bearing member in a rotary support shaft direction.

11. The line roller recited in claim 10, wherein
a lubricating grease that is different from the water-repellent grease is held on the other outer end surface of the axle bearing member in the rotary support shaft direction.

12. A spinning reel for fishing, comprising:
a rotor configured to be rotated by a rotational operation of a handle rotatably supported on a reel body; and
a fishing line guiding device comprising a line roller configured to guide a fishing line to a spool on which the fishing line is to be wound and configured to be rotated with the rotor,
the line roller comprising
a cylindrical guide member comprising a guide surface configured to guide the fishing line on an outer perimeter of the cylindrical guide member,
an axle bearing member rotatably supporting an inner perimeter surface of the guide member,
a support member supporting the axle bearing member, and
an axle bearing seal mechanism disposed in a periphery of the axle bearing member and configured to prevent the flow of water to the axle bearing member, and
the axle bearing seal mechanism comprising a grease holding unit forming a space leading from the axle bearing member to the guide member and holding a water-repellent grease in the space.

13. The spinning reel for fishing recited in claim 12, wherein
the axle bearing seal mechanism comprises a grease receiving part configured to receive the water-repellent grease that flows out when water-repellent grease flows out.

14. The spinning reel for fishing recited in claim 12, wherein
the grease holding unit comprises a seal member formed from an elastic member disposed between the guide member and the support member.

15. The spinning reel for fishing recited in claim 14, wherein
the seal member comprises
a fixed portion fixed to one of the guide member and the support member, and
a lip portion extending from the fixed portion toward the other of the guide member and the support member, and a thickness of a distal end portion of the lip portion is thinner than a thickness of the fixed portion.

16. The spinning reel for fishing recited in claim 12, wherein
the grease holding unit comprises
a first annular protruding member having an annular protrusion projecting in an axial direction or a radial direction of a rotation of the axle bearing member, and
a second annular protruding member having an annular protrusion projecting adjacently in a direction that opposes the annular protrusion.

17. The spinning reel for fishing recited in claim 12, wherein
the grease holding unit comprises
an annular protruding member having an annular protrusion projecting in an axial direction or a radial direction of a rotation of the axle bearing member, and
an annular recessed member having an annular recess that is recessed complementarily to the annular protrusion.

18. The spinning reel for fishing recited in claim 12, wherein
the axle bearing member is a sliding slider bearing rotatably supporting the guide member.

19. The spinning reel for fishing recited in claim 12, wherein
the axle bearing member is a ball bearing comprising an outer ring contacting the guide member, an inner ring contacting the support member, and a plurality of rolling bodies disposed between the outer ring and the inner ring.

20. The spinning reel for fishing recited in claim 19, wherein
a holding member connecting the guide member and the outer ring is disposed between the guide member and the outer ring, and the holding member forms a part of the grease holding unit.

21. The spinning reel for fishing recited in claim 19, wherein
an interior of the axle bearing member is configured to include the water-repellent grease.

22. The spinning reel for fishing recited in claim 12, wherein
the water-repellent grease is held in at least a portion of the space that leads to the guide member and at least one outer end surface of the axle bearing member in a rotary support shaft direction.

23. The spinning reel for fishing recited in claim 22, wherein
a lubricating grease that is different from the water-repellent grease is held on the other outer end surface of the axle bearing member in the rotary support shaft direction.

* * * * *